United States Patent
Prezet et al.

(10) Patent No.: US 12,335,349 B2
(45) Date of Patent: Jun. 17, 2025

(54) COMPUTING NETWORK SYSTEM AND METHOD

(71) Applicant: AMADEUS S.A.S., Biot (FR)

(72) Inventors: Hervé Prezet, Mougins (FR);
Massimiliano Maini, Biot (FR);
Rodolphe Texier, Vallauris (FR);
Nicolas Poirier, Peymeinade (FR)

(73) Assignee: AMADEUS S.A.S., Biot (FR)

( * ) Notice: Subject to any disclaimer, the term of this patent is extended or adjusted under 35 U.S.C. 154(b) by 0 days.

(21) Appl. No.: 18/230,397

(22) Filed: Aug. 4, 2023

(65) Prior Publication Data

US 2025/0047755 A1    Feb. 6, 2025

(51) Int. Cl.
*G06Q 10/02* (2012.01)
*G06Q 30/0241* (2023.01)
*G06Q 50/14* (2012.01)
*H04L 67/50* (2022.01)
*H04L 67/60* (2022.01)

(52) U.S. Cl.
CPC ......... *H04L 67/535* (2022.05); *G06Q 10/025* (2013.01); *G06Q 50/14* (2013.01); *H04L 67/60* (2022.05)

(58) Field of Classification Search
CPC .............................. G06Q 10/025; G06Q 50/14
See application file for complete search history.

(56) References Cited

U.S. PATENT DOCUMENTS

| | | | |
|---|---|---|---|
| 7,849,080 B2 * | 12/2010 | Chang | G06Q 30/0244 707/723 |
| 10,204,363 B2 | 2/2019 | Rollins et al. | |
| 11,086,822 B1 | 8/2021 | Kraus | |
| 11,276,094 B2 | 3/2022 | Amadieu et al. | |
| 2002/0032579 A1 | 3/2002 | Harpale | |
| 2007/0106468 A1 * | 5/2007 | Eichenbaum | G06Q 30/02 701/431 |
| 2008/0198761 A1 | 8/2008 | Murawski et al. | |
| 2019/0139166 A1 * | 5/2019 | Walker | G06Q 30/0207 |
| 2021/0004866 A1 * | 1/2021 | Bur | G06F 16/2358 |
| 2021/0217077 A1 * | 7/2021 | Drynan | G06K 7/1095 |
| 2021/0233097 A1 * | 7/2021 | Doumar | G06Q 30/0201 |
| 2022/0067788 A1 * | 3/2022 | Raviv | G06N 3/105 |

FOREIGN PATENT DOCUMENTS

FR    3069076 A1    1/2019
JP    3630389 B2    3/2005

OTHER PUBLICATIONS

DIALOG "Standard: Standards keep pace with carriers' needs" published May 2007 in Insurance Networking News: Executive Strategies for Technology Management, 10(10), 1., extracted from Dialog database on Dec. 17, 2021.

* cited by examiner

*Primary Examiner* — Vincent M Cao
(74) *Attorney, Agent, or Firm* — Perry + Currier Inc.

(57) ABSTRACT

The present specification provides, amongst other things, a computing network computing optimization and method that can select and generate a digital redirect token for association with content that includes a proposed travel schema with an affiliation with the content.

15 Claims, 11 Drawing Sheets

COMPUTING NETWORK SYSTEM AND METHOD

BACKGROUND

On the modern Internet, numerous server platforms distribute content to a vast array of client devices. Certain platforms, providing similar types of content, vie for connections with the same devices. Many platforms also host additional content, aiming to prompt client interactions that divert traffic to other platforms. However, this strategy can be counterproductive if the extra content is ignored without causing any traffic diversion, leading to a significant waste of computing networks.

SUMMARY

An aspect of the specification provides a computing network optimization engine including a processor configured to: receive an electronic travel schema available from a travel schema generator; select at least one primary content for affiliation with the electronic travel schema; generate a digital redirect token representing the electronic travel schema; determine a content propagation platform hosting the at least one primary content; and forward the digital redirect token to the content propagation platform for transmission with the primary content.

An aspect of the specification provides a computing network optimization engine wherein the processor is further configured to: receive an activation signal corresponding to the digital redirect token; and, redirect a client device to a target platform.

An aspect of the specification provides a computing network optimization engine wherein the activation signal includes an account identifier.

An aspect of the specification provides a computing network optimization engine wherein the target platform is the travel schema generator including a booking interface respective to the electronic travel schema.

An aspect of the specification provides a computing network optimization engine wherein the target platform is a server that hosts an electronic coupon respective the travel schema.

An aspect of the specification provides a computing network optimization engine wherein the primary content is a web pages, a game, a book, news, search results, a social media post, an audio file, a video file, a movie, a television program, a news cast, a talk show, and an email, a text or a direct message.

An aspect of the specification provides a computing network optimization engine wherein the electronic travel schema is a blueprint defined by a set of generalized schema parameters.

An aspect of the specification provides a computing network optimization engine wherein the generalized schema parameters include one or more of a destination, an accommodation, and an activity.

An aspect of the specification provides a computing network optimization engine wherein the electronic travel schema is based on a range of different travel actor options corresponding to the generalized schema parameters.

An aspect of the specification provides a computer readable medium for storing a plurality of programming instructions representing a digital redirect token, the programming instructions including: a network address identifier for connecting a client device to a schema generator; and, a travel schema identifier for causing generation of a proposed travel schema on the client device.

An aspect of the specification provides a method wherein the proposed travel schema is based in part on demographic information associated with an identifier object associated with the client device.

An aspect of the specification provides a method for computing network optimization including: receiving an electronic travel schema available from a travel schema generator; selecting at least one primary content for affiliation with the electronic travel schema; generating a digital redirect token representing the electronic travel schema; determining a content propagation platform hosting the at least one primary content; and forwarding the digital redirect token to the content propagation platform for transmission with the primary content.

An aspect of the specification provides a method further including: receiving an activation signal corresponding to the digital redirect token; and, redirecting a client device to a target platform.

An aspect of the specification provides a method wherein the activation signal includes an account identifier.

An aspect of the specification provides a method wherein the target platform is the travel schema generator including a booking interface respective to the electronic travel schema.

An aspect of the specification provides a method wherein the target platform is a server that hosts an electronic coupon respective the travel schema.

An aspect of the specification provides a method wherein the primary content is a web pages, a game, a book, news, search results, a social media post, an audio file, a video file, a movie, a television program, a news cast, a talk show, and an email, a text or a direct message.

An aspect of the specification provides a method wherein the electronic travel schema is a blueprint defined by a set of generalized schema parameters.

An aspect of the specification provides a method wherein the generalized schema parameters include one or more of a destination, an accommodation, and an activity.

An aspect of the specification provides a method wherein the electronic travel schema is based on a range of different travel actor options corresponding to the generalized schema parameters.

DETAILED DESCRIPTION

Figure 1:
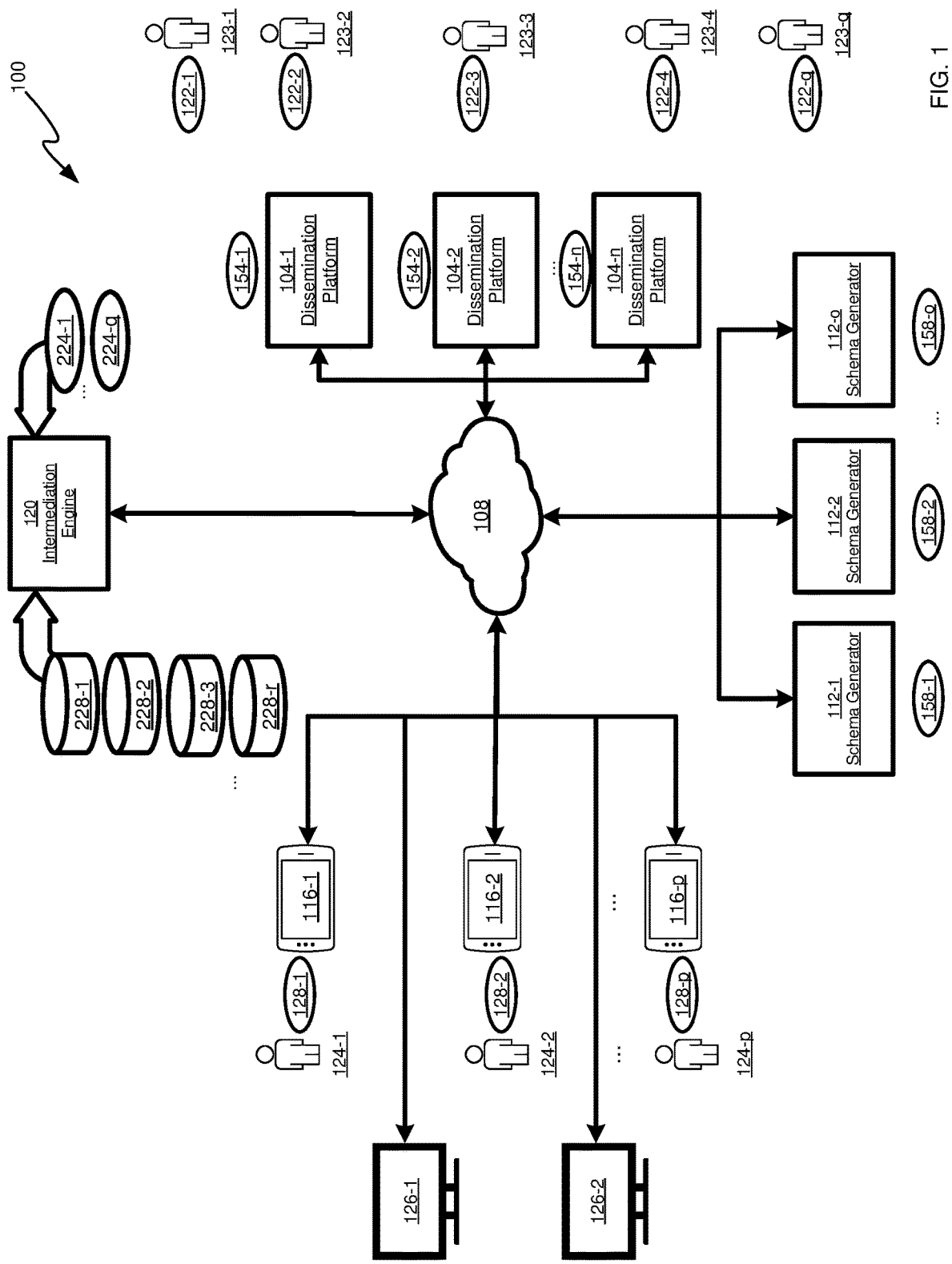
FIG. 1 is a schematic diagram of a system for computing network optimization.

FIG. 1 shows a system for computing network optimization indicated generally at 100. System 100 comprises a plurality of content propagation platforms 104-1, 104-2 ... 104-*n*. (Collectively, platforms 104-1, 104-2 ... 104-*n* are referred to as platforms 104, and generically, as platform 104. This nomenclature is used elsewhere herein.) In system 100, platforms 104 connect to a network 108 such as the Internet. Network 108 interconnects content propagation platforms 104 with: a) a plurality of travel schema generators 112; b) a plurality of client devices 116; and, d) a intermediation engine 120. As will be discussed further below, intermediation engine 120 optimizes computing network resources and performs a number of processing functions on system 100.

Platforms 104 can be based on any present or future electronic media servers that publish primary content 122 for client devices 116. Each piece of content 122 can be generated by a respective content creator 123.

Client devices 116 can be any type of human-machine interface for interacting with platforms 104 and schema generators 112. For example, client devices 116 can include traditional laptop computers, desktop computers, mobile phones, tablet computers and any other device that can be used to receive content 122 via one or more of the platforms 104 that complement the input and output hardware devices associated with a given client device 116. It is contemplated client devices 116 can include virtual or augmented reality gear complementary to virtual reality or augmented reality or "metaverse" environments that can be offered on content propagation platforms 104. Client devices 116 can be operated by different users 124 that are associated with a respective identifier object 128 that uniquely identifies a given user 124 accessing a given client device 116 in system 100.

One or more televisions 126 (or other display units, such as monitors or laptop computer screens, which are independent from devices 116) that are accessible to one or more users 124 may also be part of system 100, as will be discussed in further detail below.

In a present example embodiment, platforms 104 can be based on media platforms that carry primary content 122 for direct consumption by users 124 at client devices 116. Primary content 122 may be exclusive to one platform 104 or may be available across different platforms 104.

To elaborate, content propagation platforms 104 can be based on social media ecosystems such as, TikTok™, Instagram™, Facebook™ or the like which host primary content 122, and can embed their own secondary content (e.g. advertising of products or services available from schema generators 112) intended to divert a given client device 116 from the content propagation platform 104 towards a target platform in the form of a schema generator 112. Content propagation platforms 104 can also be based on ecosystems such as Google™, that include primary content 122 delivered via YouTube™, Google™ Maps, Google™ Search, Google™ News, while also embedding secondary content intended to direct traffic to schema generators 112. Content propagation platforms 104 can be based on television networks such as Cable News Netwrk (CNN™) the British Broadcasting Corporation (BBC™) to name but a few of the many hundreds of television networks across the globe. Thus, primary content 122 can also be provided by content propagation platforms 104 that offer web pages, games, books, news, search results, social media posts, audio files, video files, movies, television programs such as drama series, news casts, talk shows, and the like. The nature of content propagation platforms 104 is thus not particularly limited. In other variants, the primary content 122 can be provided as a text message or a direct message or an email message between users 124.

Travel actors can broadly encompass different categories of all types of travel service offerings including transportation-actors; accommodation-actors and travel-activity actors. Transportation-actors can provide transportation services for users 124, such as airlines, rental car agencies, rail services, ferries, and bus lines. Accommodation-actors can provide lodging for users 124, such as hotels, vacation rentals, resorts and B&Bs ("Bed and Breakfasts"), including the lodging at the location where a user 124 arrives after receiving a transportation service. Travel-activity actors can include providers of activities near the location where a user 124 is lodging. Travel-activity actors can thus include, by way of non-limiting examples, restaurants, spas, concert venues, exhibition centers, summits, sporting event venues, fairs, conference venues, sporting arenas, museums, art galleries, tours and resort activity centers and the like.

According to the specific illustrative example discussed further below, schema generators 112 may focus on platforms 104 that transmit content 122 of interest to users 124 who are also travelers.

As will be discussed in greater detail below, according to certain embodiments, intermediation engine 120 is configured to provide secondary content in the form of a digital redirect token that is based on a travel schema blueprint. Such travel schema blueprints may originate from anywhere, but in a present example embodiment are generated by schema generators 112 and can represent the foundation for full itineraries that may be built, modified and/or booked by users 124 via devices 116 that communicate over network 108 with the relevant generator 112.

Schema generators 112 can thus be part of e-commerce travel booking platforms that aggregate travel services such as Expedia™, Priceline™, Orbitz™, Booking.com™ and/or by individual travel actors such as airlines, railways, hotels, car rental agencies, restaurants, museums, etc, suitably modified to accommodate the teachings herein.

In some embodiments, a fully-costed travel schema can be built and include payment processing. When user 124 selects the digital redirect token generated on content propagation platform 104, it provides the opportunity to complete an electronic transaction. This transaction exchanges electronic payment messages from a financial account linked with user identifier object 128, for electronic schema fulfillment messages. These latter messages denote a complete travel schema (or other service) tied to one or more user identifier objects 128 for use by associated user 124. This example may be referred to as "travel schema fulfillment" or "complete travel schema fulfillment" or variants thereon according to context. When the embodiments herein are applied beyond travel itineraries, "travel schema fulfillment" may be seen more broadly as "service offering fulfillment", where service offerings may include other complete offerings such as travel packages of flights plus hotel, admission tickets to concerts or other travel-activity activities.

A full travel schema can be built upon the travel schema blueprint, based on a set of generalized schema parameters, allowing a multitude of specific travel itineraries to be chosen. For instance, the generalized schema parameters may be linked to a specific destination. The selection of transportation, accommodation, and/or activities may then dynamically vary based on the demographic information associated with identifier object 128. This demographic data and a set of proposed dates consistent with the access time of the digital redirect token are matched with offerings from various transportation providers for the chosen destination.

Digital redirect tokens and travel itineraries will be discussed in greater detail below.

Accordingly, client devices 116 are based on any suitable client computing platform operated by users 124 that may have an interest in the content 122 being provided on platforms 104 and the travel services being offered on schema generators 112. Each device 116 and its user 124 is thus associated with a user identifier object 128.

A person of skill in the art is to recognize that the form of an identifier object 128 is not particularly limited, and in a simple example embodiment, can be simply an alpha-numerical sequence that is unique in relation to other identifier objects in system 100. Identifier objects can also be more complex as they may be combinations of account credentials (e.g. user name, password, two-factor authentication token, etc.) that uniquely identify a given user 124. Identifier objects themselves may also be indexes that point to other identifier objects, such as accounts. The salient point is that they are uniquely identifiable within system 100 in association with what they represent.

Users 124 are typically individuals but may be corporate entities. Such users 124 interact, via devices 116, with both content propagation platforms 104 as well as schema generators 112. Each consumer identifier object 128 can be used by other nodes in system 100, including content propagation platforms 104, schema generator 112 and intermediation engine 120 to track, amongst other things: a) traffic flows between a given client device 116 and various content propagation platforms 104, including interactions (impressions as well as diversions) with a given advertising campaign; b) traffic flows between a given client device 116 and a given schema generator 112; c) diversions of traffic originated by a given client device 116 from a given content propagation platform 104 to a given schema generator 112; and d) travel-schema fulfillments arising from selection of digital redirect tokens.

Figure 2:
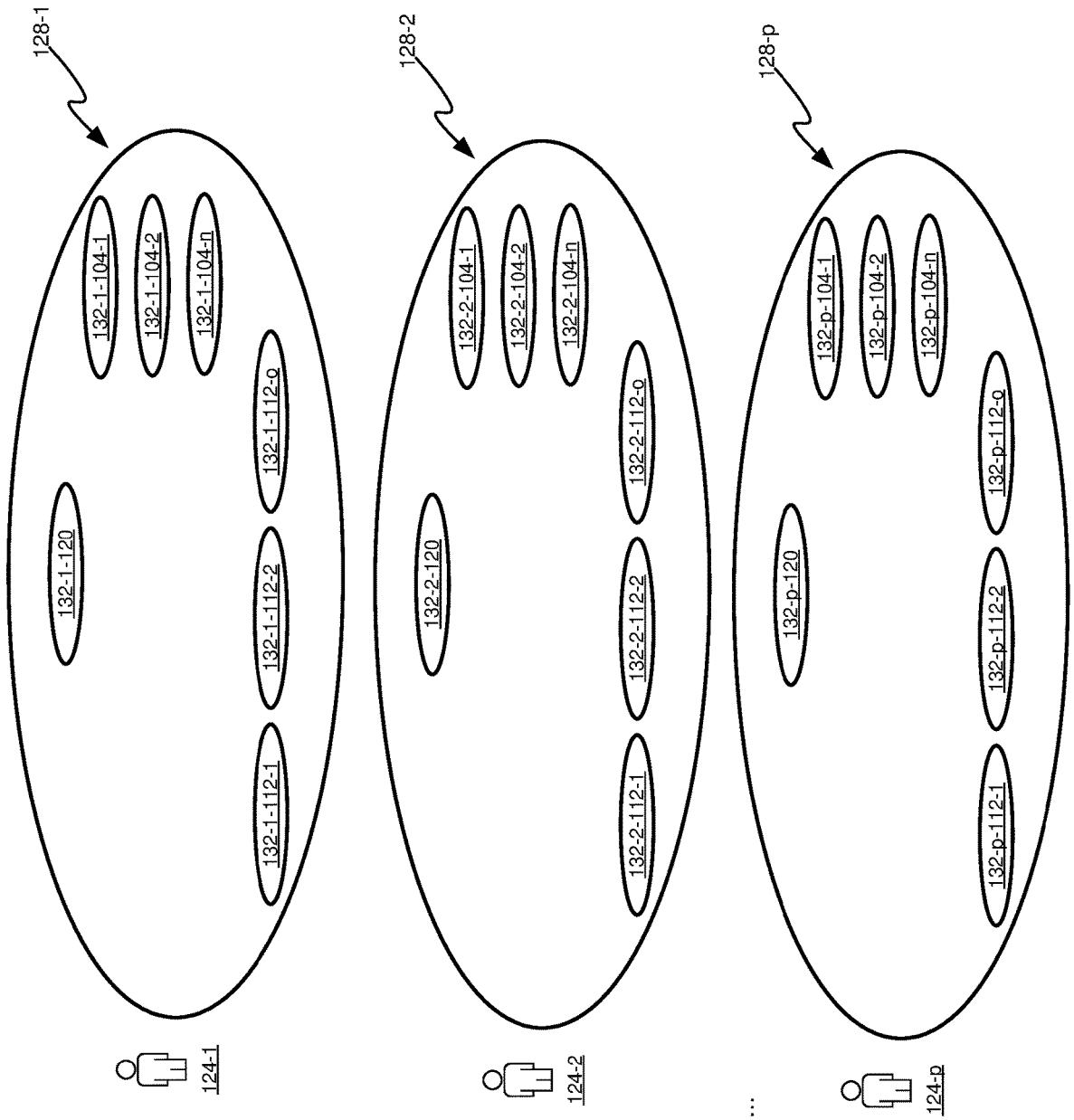
FIG. 2 shows an example structure of the identifier objects of FIG. 1.

FIG. 2 shows a non-limiting example of how consumer identifier objects 128 can be implemented as a plurality of consumer identifier sub-objects 132. Consumer identifier sub-objects 132 follow the nomenclature 132-X-Y where X corresponds to reference for a corresponding user 124 and Y corresponds to the reference for a corresponding node in system 100. (This nomenclature builds on the earlier-discussed nomenclature, since consumer identifier objects are referred to collectively as consumer identifier objects 128 and generically as consumer identifier object 128.) To elaborate, sub-objects 132-1-Y refer to user 124-1; sub-objects 132-2-Y refer to user 124-2; sub-objects 132-*p*-Y refer to user 124-*p*. Sub-object identifier 132-1-120 refers to the identifier for user 124-1 for intermediation engine 120. Sub-object identifier 132-1-104-1 refers to the identifier for user 124-1 for platform 104-1. Sub-object identifier 132-1-104-2 refers to the identifier for user 124-2 for platform 104-2. This nomenclature repeats for all identifier sub-objects 132 for each user 124, across each content propagation platform 104 and each schema generator 112.

Sub-objects 132 may be provided to anonymize, for privacy purposes, the specific identity (i.e. personally identifying information or PII) of the associated user 124. Some or all of those identifier sub-objects 132 may be anonymous or private to certain nodes in system 100 while being non-private to other nodes. For example, the operator of a schema generator 112 may maintain an account (a form of consumer identifier sub-object 132-X-112) respective to each user 124-X that expressly identifies the user 124-X to handle delivery and payment processing of a given purchased good or service, such as a ticket or voucher or a for a travel service. At the same time, the operator of content propagation platform 104 need not expressly identify a given user 124 in order to fulfill its function of associating content 122 with digital redirect tokens, but can instead rely upon generic demographic information respective to the user 124-X that can be configured to permit targeting of a digital redirect token to a given client device 116 while respecting the individual anonymity of the user 124-X of the client device 116.

For clarity in explaining specific embodiments, a single consumer identifier object 128 may be referenced for each user 124. However, those skilled in the art will understand that in certain contexts, references to identifier object 128 within system 100 could instead imply the use of a consumer identifier sub-object 132. Similarly, this contextual complexity showcases a technical advantage of the current specification. It becomes evident upon further reading that the diverse and often anonymous nature of identifier sub-objects 132 complicates load balancing of system 100. This challenge is mitigated by the techniques outlined in this specification.

In addition to the sub-objects 132 in FIG. 2, other techniques may be used to track diversions from platforms 104, including IP address tracking, pixels, HTTP tags, and various anonymization techniques may be applied to help protect PII such as data masking, pseudonymization, data aggregation, differential privacy and data generalization. Where required or desired, specific consent can also be requested from the relevant user 124.

Referring again to FIG. 1, persons skilled in the art will recognize that there are many different types of interactions between client devices 116 accessing platforms 104, and that there are many different ways such interactions may lead to diversions that cause a given client device 116 to access schema generator 112. The present specification elaborates further below on certain inventive embodiments for effecting such diversions.

It is contemplated that each content propagation platform 104 has a content propagation-reporting application 154 stored in non-volatile storage of the respective platform 104 and executable on its processor. The content propagation-reporting application 154 can be accessed by intermediation engine 120 to track the number of impressions and/or diversions (if any) from the respective content propagation platform 104 to schema generator 112 that are associated with each consumer identifier object 128. The content propagation-reporting application 154 can also be used to track queries or search for a given identifier object 128 (or a given sub-object identifier 132-X-104) or the types of content 122 being accessed on the platform 104. For example, repeated searches for a travel destination for an activity at a travel destination may be recorded in application 154 for later access by intermediation engine 120 and/or content propagation platform 104 to host content 122 and/or secondary content and/or digital redirect tokens relevant to that destination.

It is contemplated that schema generators 112 also include a target-reporting application 158 stored in non-volatile storage and executable on their processors. The target-reporting application 158 can track the various stages of the sales funnel experience for a user 124 via their respective identifier object 128. Target-reporting applications 158 can also maintain historical and future travel itineraries for each identifier object 128. Notably, repeated access of the same digital redirect token by the same user 124 may allow that user 124 to resume where they left off in the sales funnel experience.

It is also contemplated that intermediation engine 120 can be configured to store a plurality of applications 224 and datasets 228. As will be discussed further below, datasets 228 can include a demographic information dataset 228-1, which can include demographic information for each user 124 by association with their respective identifier object 128. Demographic information can include any information that identifies a given user 124 that can assist in building travel itineraries tailored to that user. An example dataset is shown below for user 124-1.

| User | User Identifier Object | Field | Data |
|---|---|---|---|
| Sample Demographic Information for User 124-1 (For Storage in Dataset 228-1) | | | |
| 124-1 | 128-1 | Name | Susan Sharma |
| | | Age | 37 |
| | | Residence City | Chicago |
| | | Interests | Mona Lisa |
| | | Last Travel Destination | Madrid |
| | | Languages | Hindi, English, French |

Additional demographic information for all users 124 can be provided in dataset 228-1. Additional, fewer or different fields may be included. Encryption and/or anonymization and/or security and/or consent mechanisms may be added to dataset 228-1 to protect personally identifiable information (PII).

Intermediation engine 120 can also be configured to generate reports based on: a) the reports from each content propagation-reporting application 154; in combination with b) reports from target-reporting application 158. Such reports thereby simplify the process of comparing the relative progress through the sales funnel experience, including actual sales conversions, associated with a given advertising campaign on each content propagation platform 104 for a respective product. In turn, the normalized reports can be used to adjust digital redirect tokens and/or control which content 122 is associated with which digital redirect tokens, thereby reducing or eliminating wasted delivery (and associated waste of communication and other computing networks) of digital redirect tokens from content propagation platforms 104 that do not result in diversions to platforms 104 and/or do not result in completion of travel bookings on schema generators 112.

Intermediation engine 120 can also be configured to access content propagation-reporting applications 154 to note, in the aggregate, top impressions of different content 122 by users 124.

Such reports can also be used in the generation of digital redirect tokens, and respective travel itineraries and generalized schema parameters, including the potential use of machine learning, as will be discussed in greater detail below.

Intermediation engine 120 can also be configured to access target-reporting applications 158 to update demographic information dataset 228-1 with account identifier objects 128 associated their respective users 124. Where management of personally identifiable information (PII) is included in system 100, then if permission is granted by a user 124 then intermediation engine 120 may specifically identify a given user 124; or if no permission is granted, then intermediation engine 120 may only access meta-results such as generalized demographic data for the user 124.

(Other means of implementing the functionality of applications 154 and applications 158 will occur to those of skill in the art. For example, where a global distribution system (GDS) such as Amadeus is part of system 100, then Passenger Name Records (PNR) for each user 124 may be recorded for past trips as part of their demographic information within dataset 228-1, and PNRs that are generated for itineraries that are created according to the present teachings can be recorded by the GDS and made directly available to engine 120, without the need for involving applications 154 or applications 158. At this point it can be noted that engine 120 itself can be incorporated directly into a GDS.)

Figure 3:
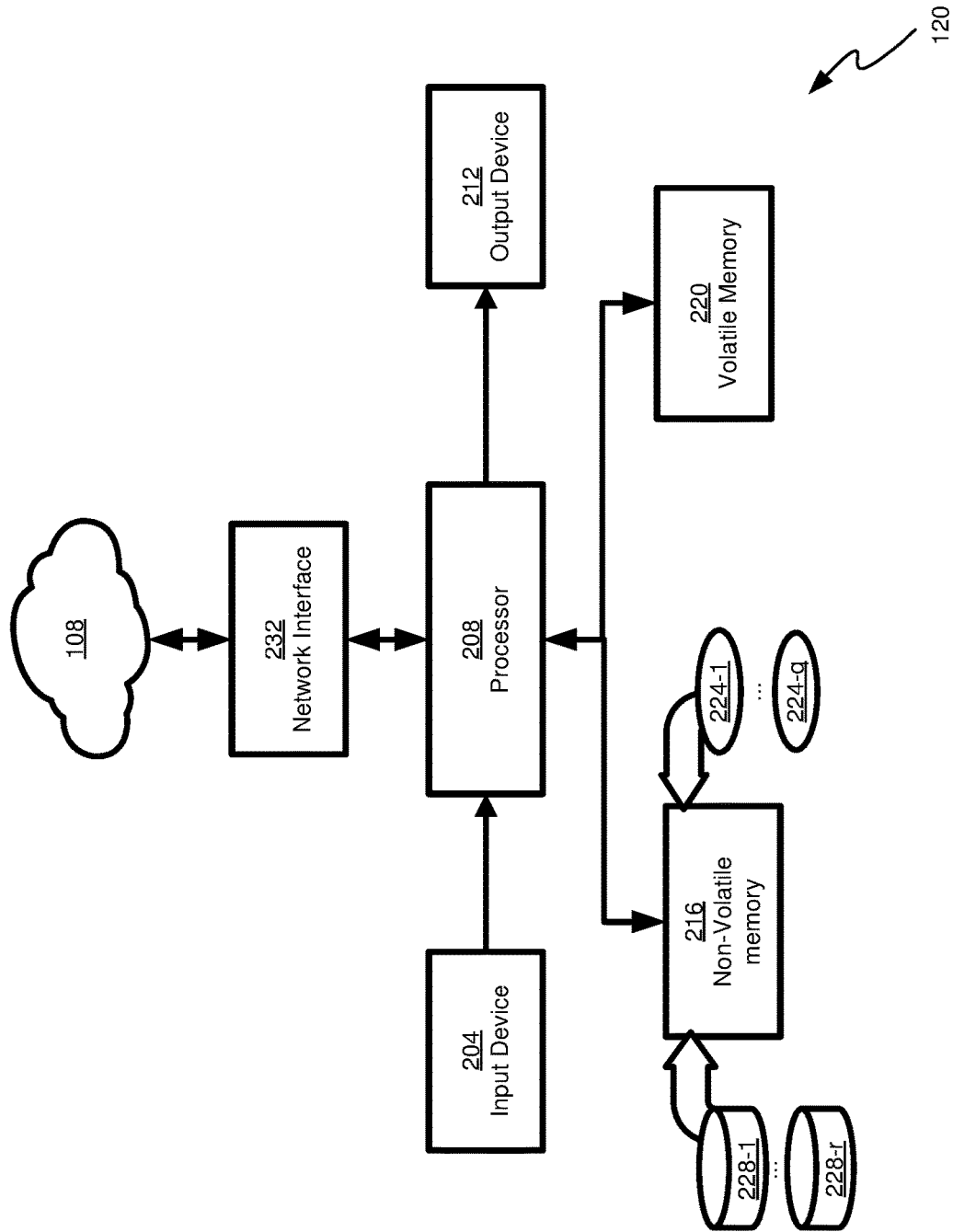
FIG. 3 is a block diagram of example internal components of the computing network optimization of FIG. 1.

Having described an overview of system 100, it is useful to comment on the hardware infrastructure of system 100. FIG. 3 shows a schematic diagram of a non-limiting example of internal components of intermediation engine 120.

In this example, intermediation engine 120 includes at least one input device 204. Input from device 204 is received at a processor 208 which in turn controls an output device 212. Input device 204 can be a traditional keyboard and/or mouse to provide physical input. Likewise output device 212 can be a display. In variants, additional and/or other input devices 204 or output devices 212 are contemplated or may be omitted altogether as the context requires.

Processor 208 may be implemented as a plurality of processors or one or more multi-core processors. The processor 208 may be configured to execute different programming instructions responsive to the input received via the one or more input devices 204 and to control one or more output devices 212 to generate output on those devices.

To fulfill its programming functions, the processor 208 is configured to communicate with one or more memory units, including non-volatile memory 216 and volatile memory 220. Non-volatile memory 216 can be based on any persistent memory technology, such as an Erasable Electronic Programmable Read Only Memory ("EEPROM"), flash memory, solid-state hard disk (SSD), other type of harddisk, or combinations of them. Non-volatile memory 216 may also be described as a non-transitory computer readable medium. Also, more than one type of non-volatile memory 216 may be provided.

Volatile memory 220 is based on any random access memory (RAM) technology. For example, volatile memory 220 can be based on a Double Data Rate (DDR) Synchronous Dynamic Random-Access Memory (SDRAM). Other types of volatile memory 220 are contemplated.

Processor 208 also connects to network 108 via a network interface 232. Network interface 232 can also be used to connect another computing device that has an input and output device, thereby obviating the need for input device 204 and/or output device 212 altogether.

Programming instructions in the form of applications 224 are typically maintained, persistently, in non-volatile memory 216 and used by the processor 208 which reads from and writes to volatile memory 220 during the execution of applications 224. Various methods discussed herein can be coded as one or more applications 224. One or more tables or datasets 228 are maintained in non-volatile memory 216 for use by applications 224.

The infrastructure of intermediation engine 120, or a variant thereon, can be used to implement any of the computing nodes in system 100, including platforms 104 and schema generators 112. Furthermore, intermediation engine 120, platforms 104 and schema generator 112 may also be implemented as virtual machines and/or with mirror images to provide load balancing. Functions of intermediation engine 120 may also be distributed amongst different schema generators 112 and/or platforms 104, thereby obviating the need for a centralized intermediation engine 120. By the same token, a plurality of engines 120 may be provided.

Furthermore, a person of skill in the art will recognize that the core elements of processor 208, input device 204, output device 212, non-volatile memory 216, volatile memory 220 and network interface 232, as described in relation to the server environment of intermediation engine 120, have analogues in the different form factors of client machines such as those that can be used to implement client devices 116. Again, client devices 116 can be based on computer workstations, laptop computers, tablet computers, mobile telephony devices or the like.

Likewise, televisions 126 can be based on architectures analogous to the architecture of intermediation engine 120, and televisions 126 can be SmartTVs, desktop computer monitors, laptop monitors and any other device otherwise capable of displaying content 122.

Figure 4:
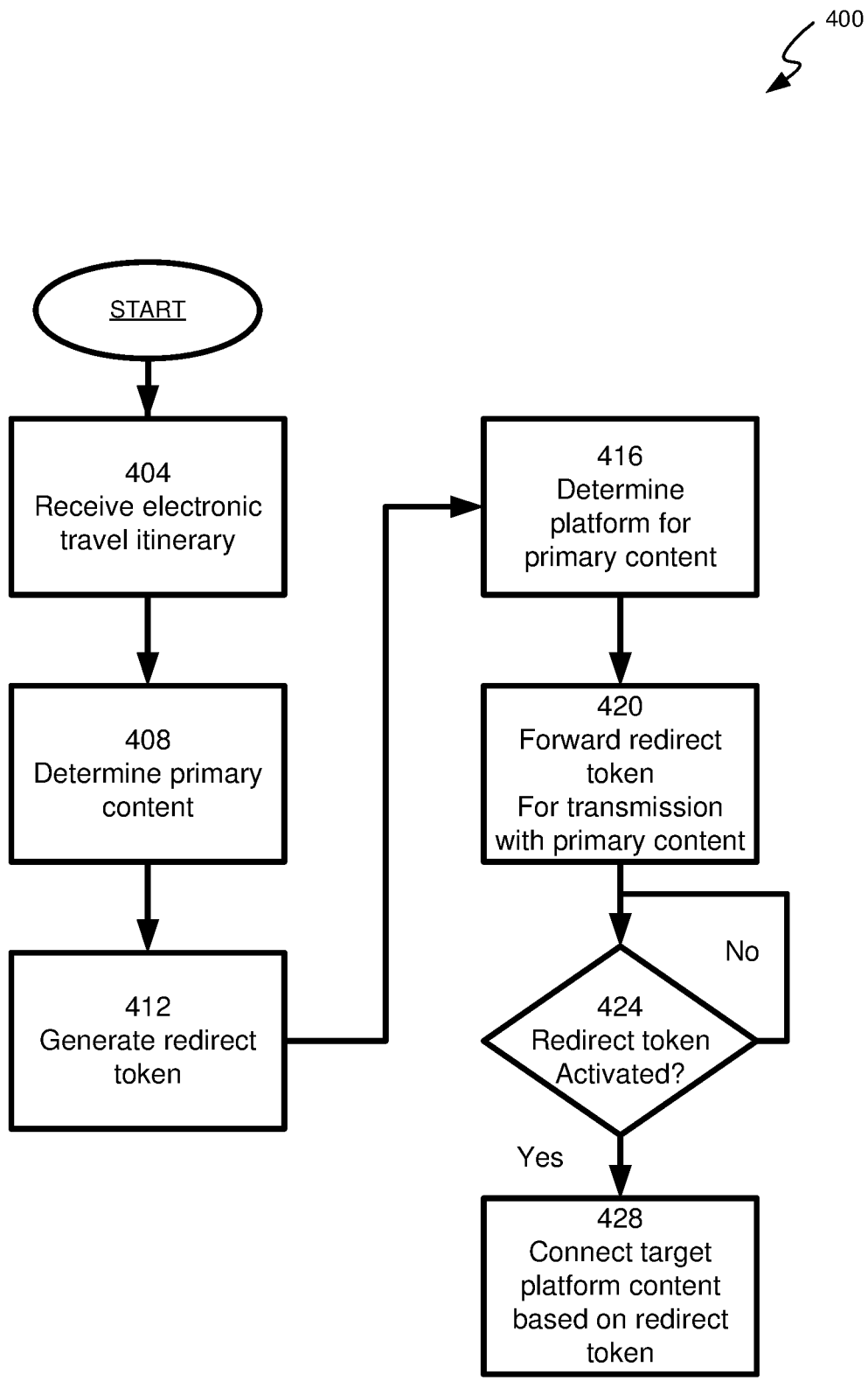
FIG. 4 shows a flowchart depicting a method for computing network optimization.

FIG. 4 shows a flowchart depicting a method for computing network optimization indicated generally at 400. Method 400 can be implemented on system 100. Persons skilled in the art may choose to implement method 400 on system 100 or variants thereon, or with certain blocks omitted, performed in parallel or in a different order than shown. Method 400 can thus also be varied. However, for purposes of explanation, method 400 will be described in relation to its performance on system 100 with a specific focus on treating method 400 as, for example, application 224-1 can be maintained within and executed by intermediation engine 120, interacting with other nodes in system 100.

Block 404 thus comprises receiving an electronic travel schema. The electronic travel schema can be a schema blueprint or a full specific schema. The means by which the schema is generated is not particularly limited, but it is generally contemplated that an operator of one of the schema generators 112 will create an schema that may be of interest to one or more users 124. Again, the travel schema may be specific and/or based on a set of generalized schema parameters within which a plurality of specific travel itineraries can be built and/or selected. Dataset 228-2 shows an example of an electronic schema that can be received at block 404, with an example of a specific schema as well a set of a generalized schema parameters. (In variants, either a specific schema or a set of generalized schema parameters may be provided.)

Sample Schema 504
(For Storage in Dataset 228-2)

| Travel Parameter | Specific Schema | Schema Blueprint (Generalized schema parameters) |
|---|---|---|
| Flight | Origin: ORD (Chicago) Destination: CDG (Paris) Depart: Jun. 15, 2023, 9PM Return: Jun. 23, 2023, 6AM Airline: ABC Airlines Class: Economy | Origin: TBD Destination: Paris Airports Depart: TBD Return: TBD |
| Hotel | Accommodation: DEF Hotel Check-in: Jun. 15, 2023 Check-out: Jun. 23, 2023 | Accommodation: TBD Check-in: TBD Check-out: TBD |

-continued

Sample Schema 504
(For Storage in Dataset 228-2)

| Travel Parameter | Specific Schema | Schema Blueprint (Generalized schema parameters) |
|---|---|---|
| Activity | Event: Louvre Tour Date: Jun. 17, 2023 | Museum Tours |

Figure 5:
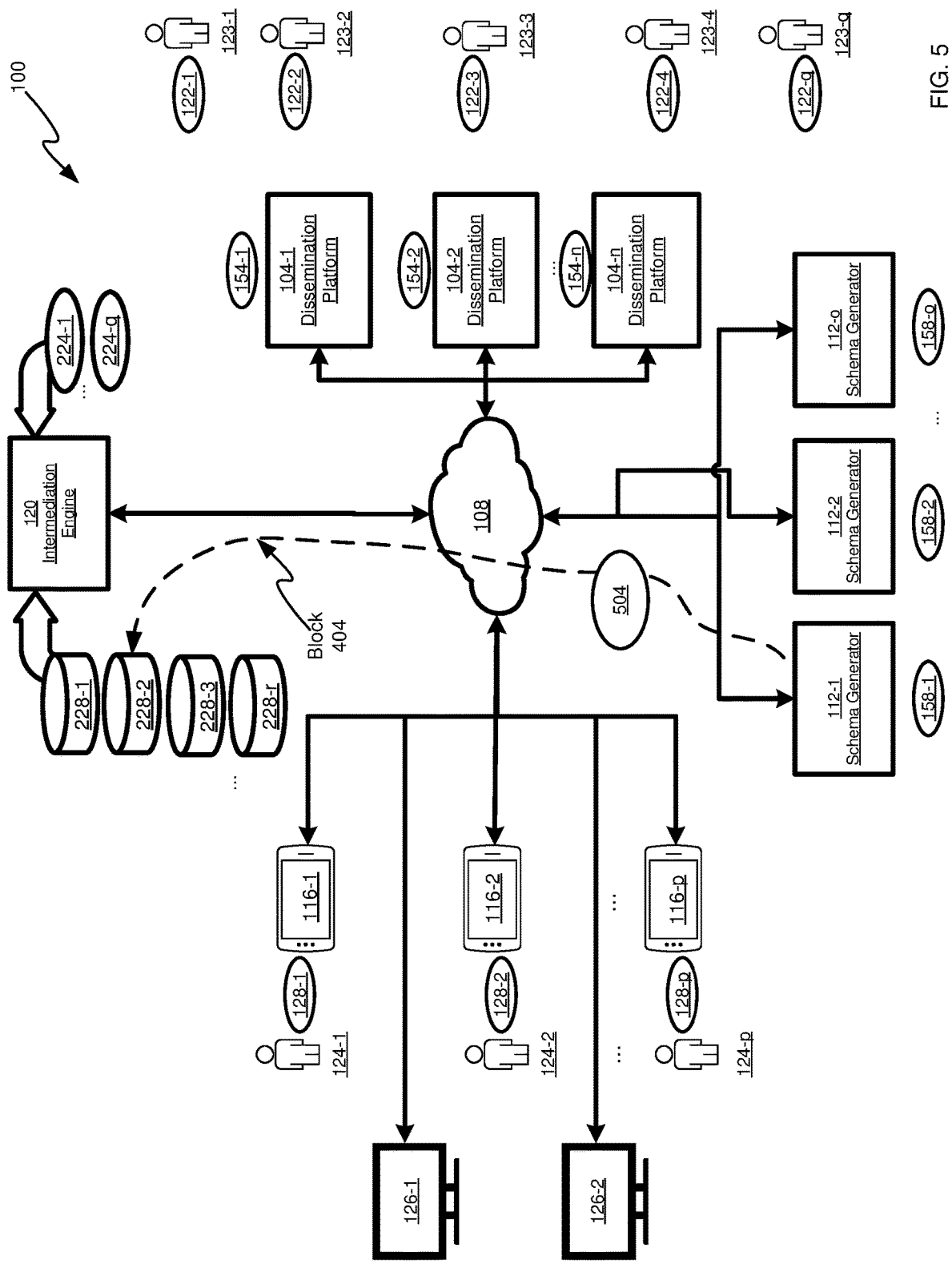
FIG. 5 shows the system of FIG. 1 performing one of the blocks of the method of FIG. 4.

When method 400 is implemented on system 100, the travel schema received at block 404 can be received by intermediation engine 120 which stores the schema in non-volatile memory 216 in one of the datasets 228. To continue with the specific example, schema 504 is saved as dataset 228-2. Example performance of block 404 is shown in FIG. 5 as schema 504 is shown as being sent from schema generator 112-1 to intermediation engine 120 and stored in dataset 228-2. It is to be understood that schema 504 is encoded in a structured format according to an electronic data standard understandable to both intermediation engine 120 and schema generator 112-1, although a large language model (LLM) or application programming interface (API) may be used to normalize any differences in formatting at either node.

According to dataset 228-2, schema 504 includes a specific schema including a flight from Chicago to Paris on ABC Airlines at a specific date, with accommodations at DEF Hotel, and tickets to a tour at the Louvre Museum on a specific date. Note the specific schema is not an actual booking, rather it is a predefined tour package that if selected by a user 124, could be readily converted into a booking for that user 124. Schema 504 is also defined by a set of generalized schema parameters within which a plurality of specific travel itineraries can be selected. According to dataset 228-2, a reduced set of generalized schema parameters is provided which simply refers to the destination as any airport in the Paris region, with the activities at the destination being museum tours; no accommodations are defined. The generalized set of schema parameters can form the basis of a trip to Paris for a given user 124, generalized from the specific schema in dataset 228-2, wherein Paris is the destination and the activities in Paris will include a tour of museums, which could include the Louvre and/or other museums. Such a trip schema may eventually be customized according to the demographic information about the user 124 within dataset 228-1.

Notwithstanding this specific example, it is to be understood that the schema received at block 404 can have many different configurations, fields, and parameters, and the rationale for its generation can be multifold. One example rationale is a tour package such as the sample schema 504, intended to sell services from various travel actors. Another example is a tourism campaign by a local tourism authority, such as a city or a state or a country, designed to bring users 124 to the destination regardless of any specific travel actors. Another example is a mass evacuation program, designed to take users 124 out of a given origin location of danger and/or direct them to a destination location of relative safety. The salience of these examples will be more clear upon further review of this specification.

Block 408 comprises determining primary content. In some embodiments, the selected primary content can be based on the schema from block 404, to find content 122 that is complementary to the schema 504. For example, if content 122-1 is a video travel vlog with an episode about Paris France and touring the Louvre, then content 122-1 can be considered an appropriate selection of content for affiliation with the schema 504. In general, any content 122 such as travel vlogs, art vlogs, or other content related to travel, art, France, Paris, or Europe can be a suitable selection for schema 504. Content 122 may also be chosen based on the creator 123, meaning that any content 122 from a particular creator 123 may be selected, particularly where the creator 123 is known to generate significant amounts of traffic for any of their content 122.

Intermediation engine 120 can be configured to search content 122 across platforms 104 for creators 123, titles, closed captions or any other tags or indicia 604 that is associated with the content 122 for searching purposes, such as might be obtained via a Google™ or Bing™ search query. Intermediation engine 120 can be configured to examine various fields within schema 504 to build the query (not shown), or schema 504 can be provided with an express field that identifies the type of content 122 or creator 123 that is deemed suitable for affiliation with the schema 504.

Where no existing content 122 is deemed suitable for affiliation according to a search, then block 408 can comprise engaging a creator 123 to produce original content 122 that is tailored to the schema 504. The content request can be very granular. For example, if a travel schema blueprint includes a single general schema parameter directed to a specific hotel view from a specific hotel, and no other parameters, then a creator 123 can be requested to produce original content 122 that is directed at that single general schema parameter. Such customized content 122 may showcase or review the specific room, or block of rooms with the similar view. Combinations of general parameters are also contemplated, such as restaurant combined with a hotel, or a museum combined with a hotel and a travel airline.

Figure 6:
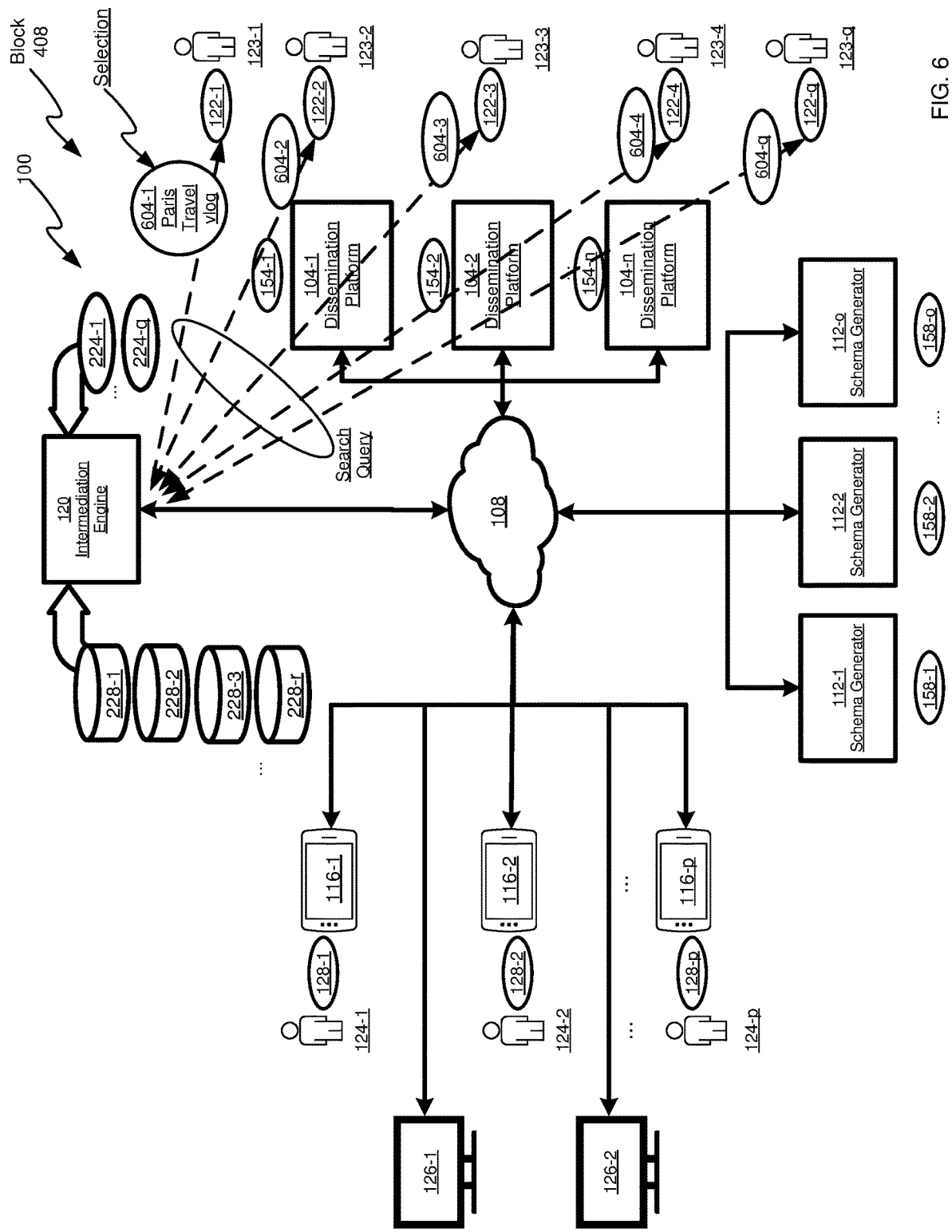
FIG. 6 shows the system of FIG. 1 performing one of the blocks of the method of FIG. 4.

Example performance of block 408 is shown in FIG. 6, as a plurality of indicia 604, each associated with respective content 122, is represented as being searched by intermediation engine 120, with indicia 604-1 associated with the Paris France Travel Vlog content 122-1 being selected.

Block 412 comprises generating a redirect token. The redirect token will be accessible on a device 116 that is accessing content 122, which when selected by a user 124 from their device 116 will cause their device 116 to divert its connection over network 108 from whichever platform 104 is showing the content 122 to one of the schema generators 112. The technological implementation of the redirect token is not particularly limited but can be a Quick Response code ("QR-code") displayed on a television 126 and scannable by using a camera on device 116, and/or a Uniform Network Locator (url) that is selectable from device 116. Other technological implementations for a redirect token will occur to those skilled in the art.

The redirect token typically includes an identification of the schema from block 404 and a relevant schema generator 112. The redirect token may also include an identification of the content 122 selected at block 408 and, when the token is activated and the traffic redirection is effected, may carry the identifier object 128 of the user 124 that accessed the redirect token to the schema generator 112. The redirect token may also identify a relevant creator 123, content 122, platform 104, which can be used to for a variety of purposes such as fulfilling any commercial terms related to impressions or fulfilments arising from the redirect token.

Block 416 comprises determining a content propagation platform. The content propagation platform 104 that is selected at block 416 can be one or more of the platforms 104 that show the content 122 selected at block 408. Where the content 122 from block 408 is exclusive to a given platform 104, then the determination at block 416 is trivial and indeed block 416 can even be omitted as method 400 can include a direct interact between intermediation engine 120 and the respective content 122 and/or creator 123 via network 108, since the platform 104 is implicit. In more complex scenarios, content 122 may be available across several platforms 104, in which case, block 416 can include selection of one or more of those platforms 104 and/or selection of the content 122, leaving the selection of the platform(s) 104 to creator 123. For example, where platforms 104 include television networks in different countries that each carry the same content 122, then block 416 can include selecting one or more of those television network platforms 104.

According to our simplified illustrative example, it will be assumed that content 122-1 is exclusive to platform 104-1, and therefore platform 104-1 is chosen.

Figure 7:
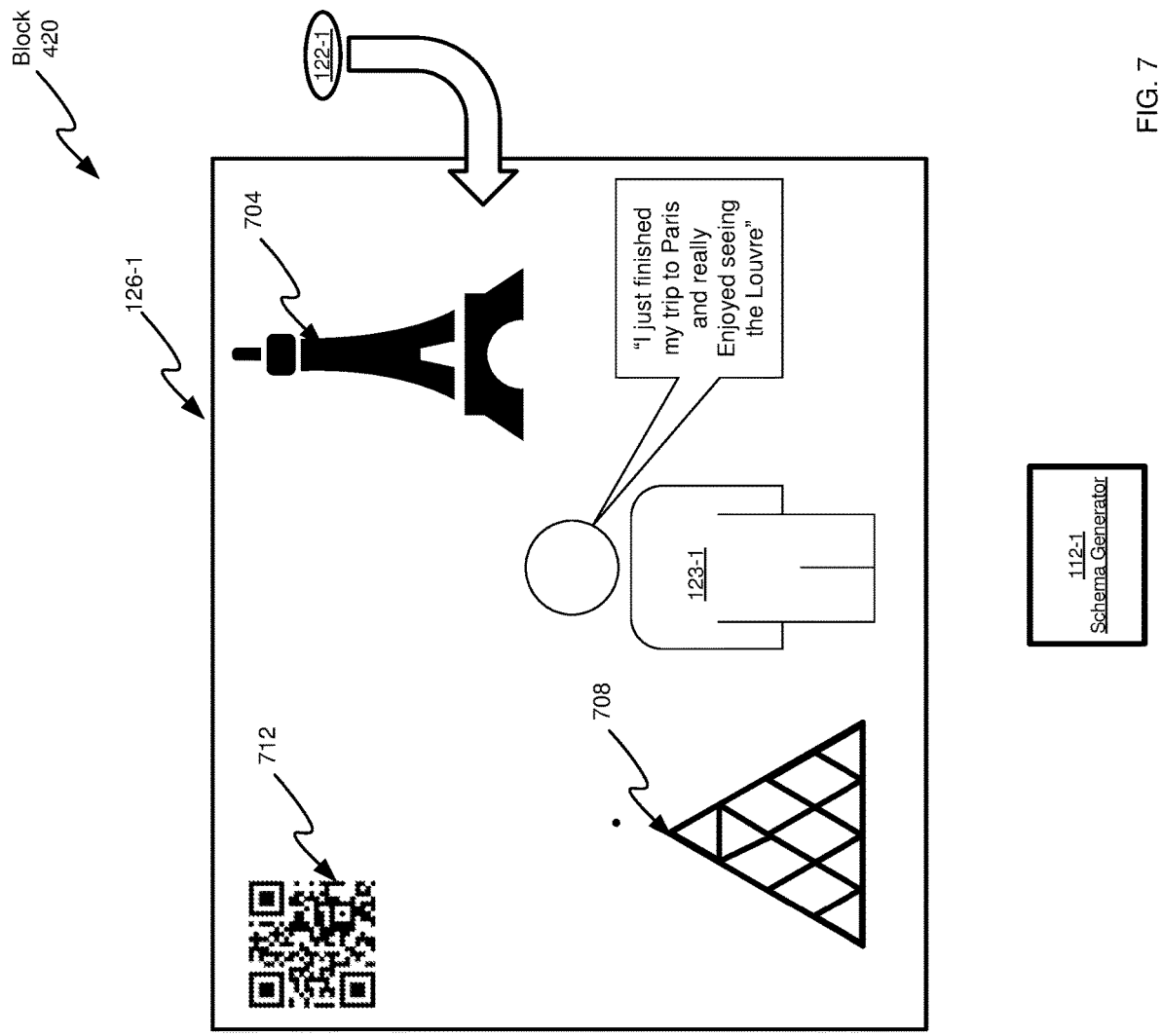
FIG. 7 shows a portion of the system of FIG. 1 performing one of the blocks of the method of FIG. 4.

Block 420 comprises forwarding the redirect token for transmission with the primary content. The transmission may be integrated into the content itself, such as showing a QR code or url throughout all or part of the transmission of the content, and/or the transmission may be within the comments, metatags or other surrounding descriptors associated with the content. In the present example, the redirect token generated from block 412 is forwarded to the platform 104-1 from block 416 for integration into the transmission of the content 122-1 selected at block 408. Block 420, according to our specific example, is represented in FIG. 7, which shows a portion of the nodes of system 100 that are illustrative. In FIG. 7, television 126-1 is shown displaying a portion of content 122-1, including frames from vlog about touring the Louvre in Paris as presented by creator 123-1. (The Eiffel tower 704 and Louvre 708 are shown as iconic representation in FIG. 7, but a person of skill in the art can envision the live action footage of Paris and these two famous landmarks, along with the audio commentary spoken by the creator 123-1.) Again, this specific example of content 122-1 is non-limiting, merely illustrative.

Television 126-1 is also shown as displaying a redirect token 712 in the form of a QR code. For the purposes of our example, QR code redirect token 712 represents the example redirect token generated at block 412.

Block 424 comprises a wait state which loops back on itself until the redirect token generated at block 420 is activated. Content 122-1 continues to be transmitted until generation of the content 122-1 ceases, in which case a "no" state persists at block 424 and method 400 ends without reaching block 428. For simplicity, this outcome is not shown in FIG. 4 but it is nonetheless to be understood.

Figure 8:
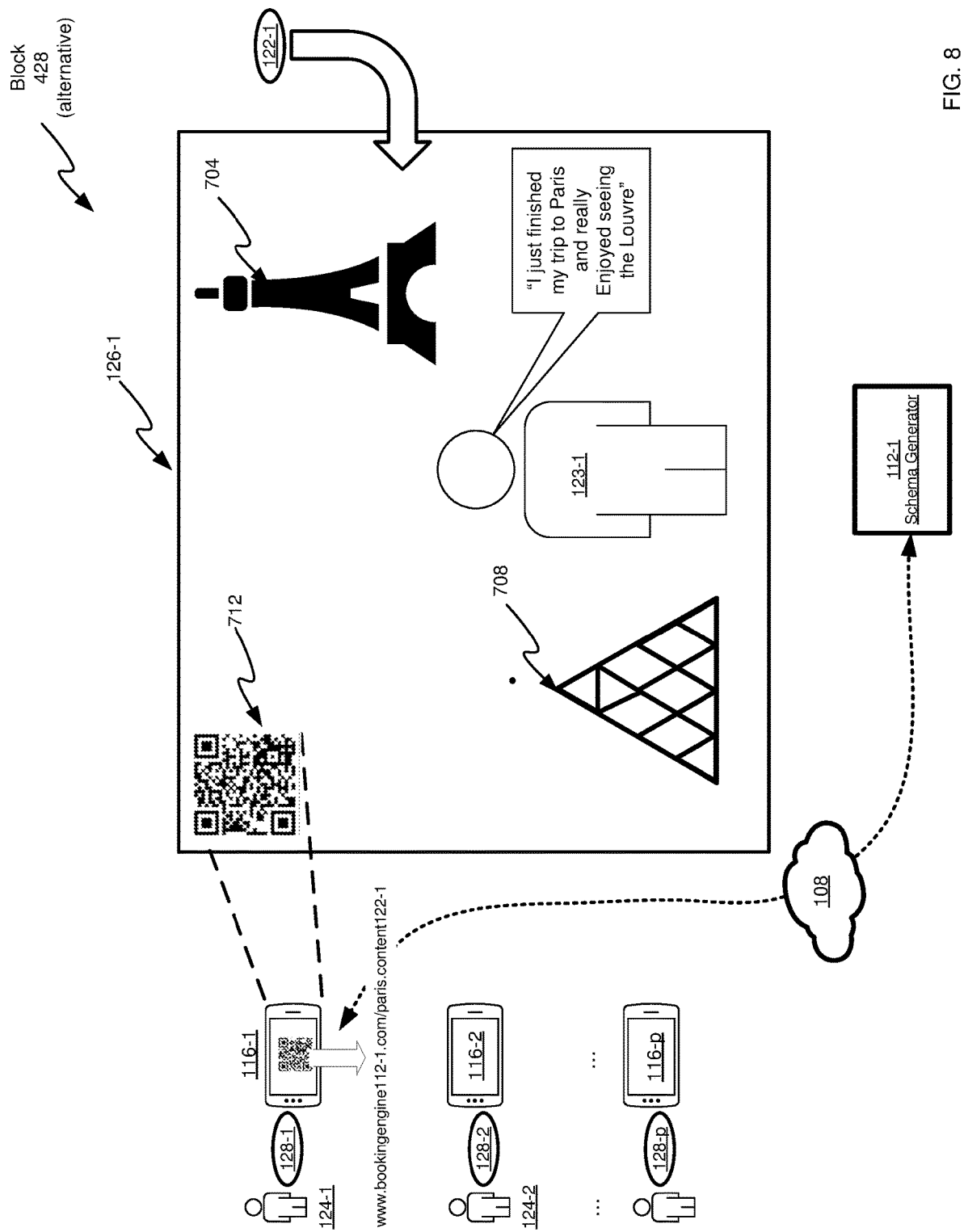
FIG. 8 shows a variant on FIG. 7.

A "yes" determination at block 424 means that a device 116 activated the token. Such an activation signal brings method 400 to block 428 at which point a connection is made to the appropriate target platform, such as the schema generator 112-1, based on the configuration of the redirect token as generated at block 412. Example performance of block 428 is shown in FIG. 8, as device 116-1 is shown as scanning QR code redirect token 712 which causes device 116-1 to connect to schema generator 112-1.

As noted above, due to the configuration of redirect token 712, schema generator 112-1 can infer the schema 504 and content 122-1 that is associated with the token 712, and may also have access to identifier object 128-1. Accordingly, it is possible for schema generator 112-1 to generate a tailored travel schema to Paris France for user 124-1, complete with flight, accommodation, and Louvre tickets. Travel dates can be inferred as to being some suggested date in the future. In more sophisticated embodiments, demographic information dataset 228-1 can include known upcoming vacation or preferred travel dates, such as through access to the calendar of user 124 or by recording historical searches, thereby allowing the suggested travel schema to be extremely specific. By the same token, origin can also be inferred based on geo-location information of the relevant user 124, either in real-time or based on data in dataset 228-1 about the home of user 124. For example, if user 124-1 is in Winnipeg, Canada, then the tailored travel schema can show flights from Winnipeg to Paris. Alternatively, if user 124-1 is in Ottawa, Canada, then the tailored travel schema can show flights from Ottawa to Paris. Other variables in the travel schema will now occur to those of skill in the art. schema generator 112-1 can complete the sales funnel experience by simply generating a booking interface to "check out" and authorize payment and thereby trigger issuance of electronic tickets.

If schema generator 112-1 has access to all demographic information dataset 22-8-1 associated with identifier object 128-1, then schema generator 112-1 may be able to effect fully automated payment processing, ticketing, seating preferences, baggage preferences, based on stored profile information in object 128-1. Alternatively, or in addition, schema generator 112-1 can use the general schema parameters to create a search that is pre-curated for travel that has been inspired by content 122-1 and/or creator 123-1, with a variety of flights, accommodations and museum ticketing options immediately available for browsing on device 116-1.

Again, if schema generator 112-1 has access to identifier object 128-1 and related demographic information about user 124-1 within dataset 228-1 or elsewhere, then the searches can be further curated according to historical information about user 124-1. In addition to the foregoing, non-limiting examples of additional demographic information can include preferred airlines including seat classes, loyalty program information; preferred hotel chains or levels or types of accommodation; and, any known activity preferences for the user 124-1. The access to object 128-1 and associated information about user 124-1 may be limited according to PII and/or lack of history about user 124-1, but nonetheless the present specification still provides technical advantages by the fact that the expression of interest has been triggered by token 712 and therefore various searches on schema generator 112-1 can be automatically generated and pre-curated, thereby reducing the amount of manual searching by user 124-1.

In another variant, it is to be understood that block 428 can be performed by a combination of functionality between intermediation engine 120 and schema generator 112-1, particularly where the redirect token from block 412 only includes a travel schema blueprint of certain generalized travel schema parameters. According to this variant, upon activation of the redirect token 712 at block 424, device 116-1 initially connects to intermediation engine 120. Intermediation engine 120 examines redirect token 712 and extracts the generalized schema parameters from the travel schema blueprint, (i.e. "Paris Airports" and "Museum Tours"). Intermediation engine 120 then examines demographic information for user 124-1 from dataset 228-1 and ascertains that the user 124-1 is named "Susan Sharma" and lives in Chicago and has an interest in the "Mona Lisa", a painting on the display at the "Louvre Museum". Intermediation engine 120 can thus build a more specific travel search query on behalf of user 124-1 for schema generator 112-1. (In this way, schema generators 112 can be based on existing schema generator technology and need not be modified, in this variant, to accommodate the present teachings.)

The more specific travel search query can thus be based on the travel schema blueprint of dataset 228-2 within token 712 and combined with the information in the token 712 with the demographic information dataset 228-1. Specifically, a Flight schema can be based on the origin "Chicago" from demographic information dataset 228-1 and the destination "Paris Airports" from the token 712. Furthermore, a Travel Activity of a "Louvre Tour" can be based on "Museum Tours" from the token 712, combined with the "Mona Lisa" interest from the demographic information dataset 228-1. The final search query that is sent to schema generator 112-1 will thus be:

"Traveler Name: Susan Sharma
Origin: Chicago
Destination: Paris
Activity: Louvre Museum Tour Tickets Intermediation engine 120 can automatically provide additional criteria such as hotels, future travel dates or as much information as possible so that schema generator 112-1 can simply return a complete proposed schema that is tailored to user 124-1, or schema generator 112-1 can prompt for manual entry by user 124-1 any additional information for the schema, or schema generator 112-1 may only complete a partial schema for flights and/or museum tour tickets, leaving user 124-1 to make other arrangements for other aspects of the travel schema such as accommodation.

Figure 9:
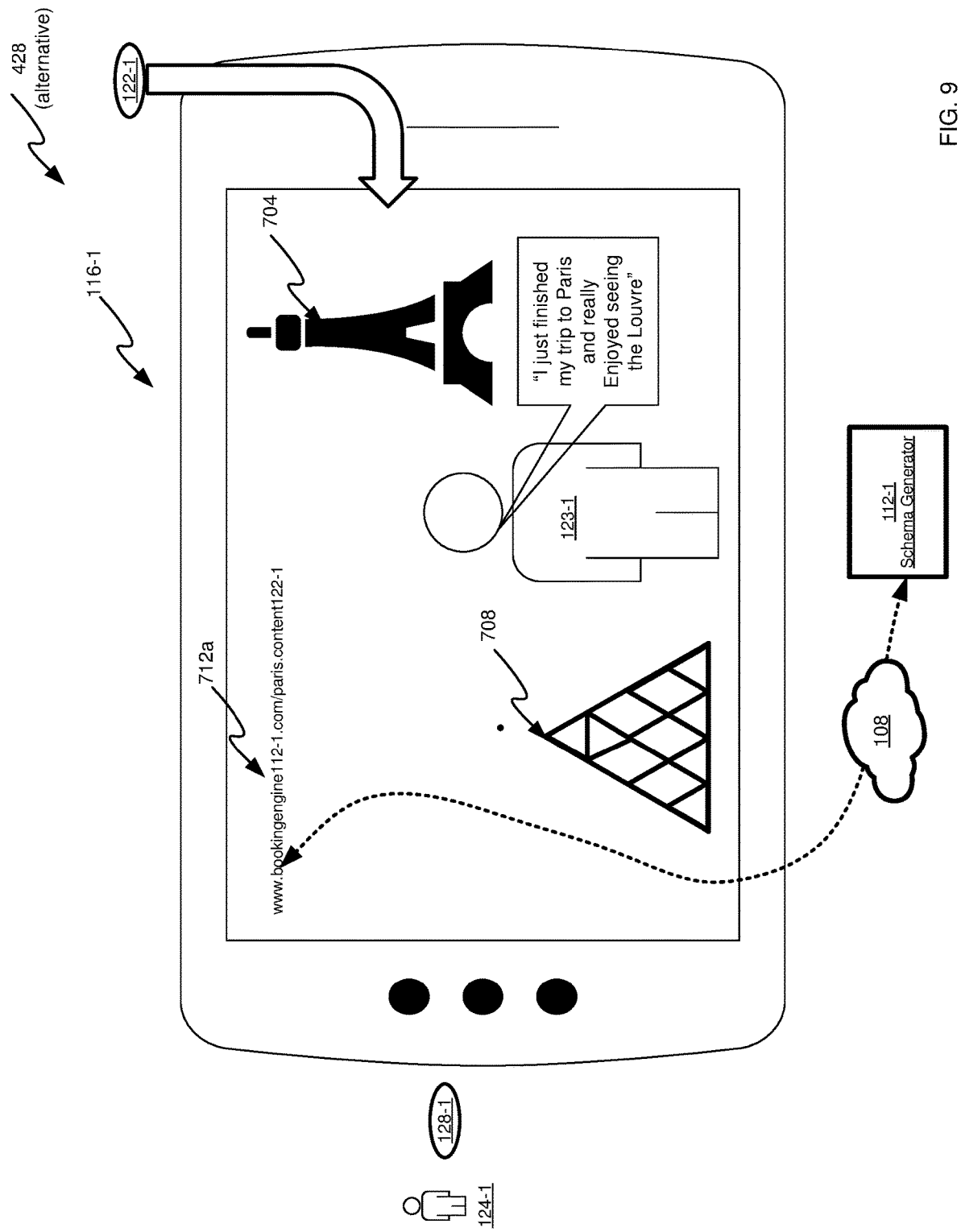
FIG. 9 shows another variant on FIG. 7.

FIG. 9 shows a variation on FIG. 8, where content 122-1 is shown directly on device 116-1, and a url digital redirect token 712a is provided instead of QR code digital redirect token 712 is provided. Url digital redirect token 712a includes a deep-link to a network address identifier and a travel schema identifier associated with the schema 504 as hosted on schema generator 112-1, with the illustrative example www.bookingengine112-1.com/paris.content122-1. Token 712a can be selected by user 124-1 and diverted from content 122-1 directly to the sales funnel searching and booking experience on schema generator 112-1.

Alternatively, as noted above, the deep-link can be directed to intermediation engine 120 (e.g. www.intermediationengine120.com/bookingengine112-1/paris.content122-1)

Figure 10:
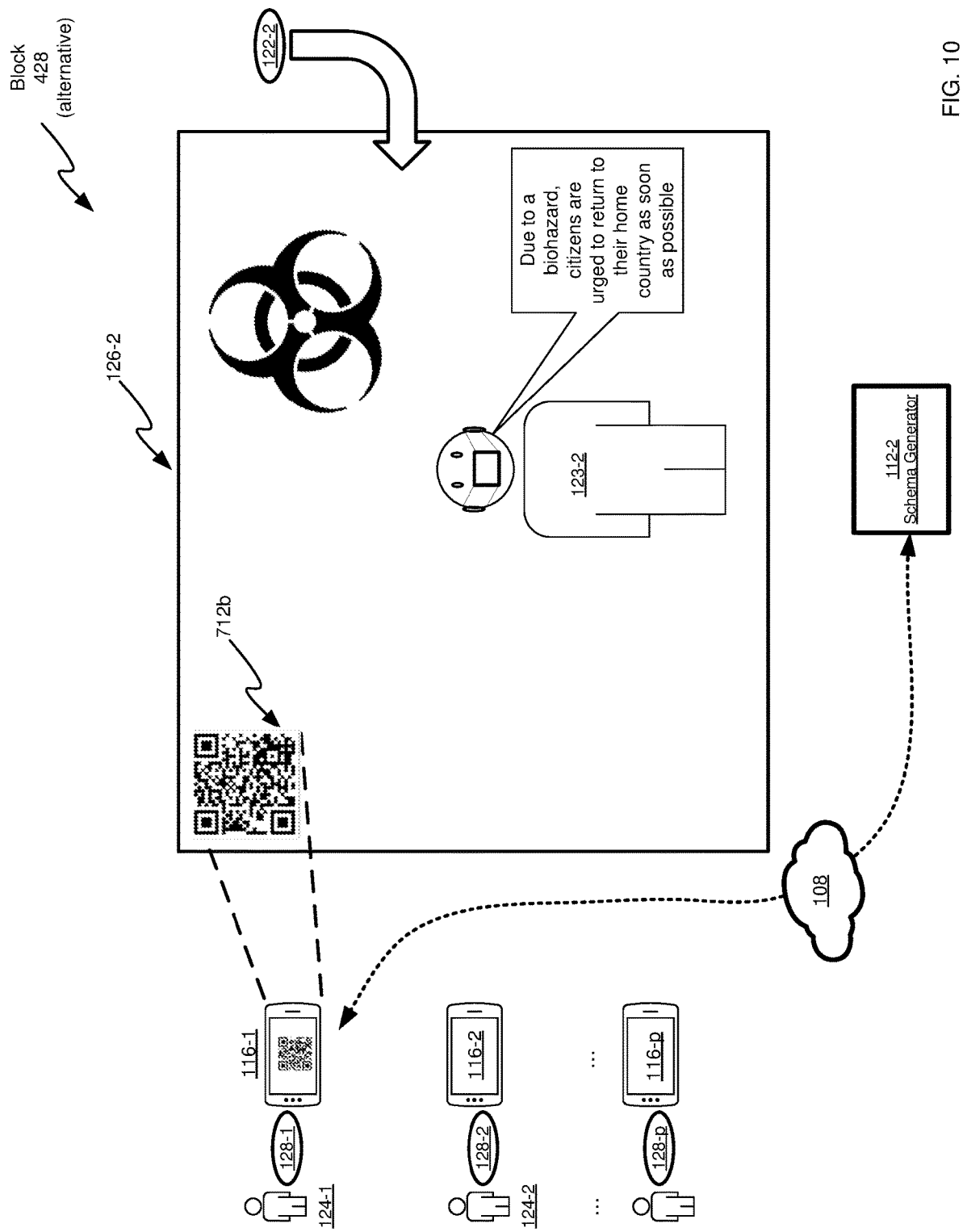
FIG. 10 shows another variant on FIG. 7.

At this point it can be reemphasized that the order of performance of the blocks in method 400 is not particularly limited. Indeed block 408 can be performed before block 404; in other words, the schema chosen at block 404 can be defined to complement the content 122 that is available or chosen at block 408. An illustration is shown in FIG. 10, where for example, in the event of a crisis such as a pandemic, war, or biohazard then system 100 and method 400 can be modified to generate a token 712b that complements content 122-2. Content 122-2 is a news broadcast warning citizens to return to their homes to find safety from the crisis. Token 712b can thus include an schema with an origin from the source of the crisis, and when token 712b scanned by a user 124, device 116 can be diverted to a schema generator 112-2 that is pre-curating searches for travel away from the origin of the crisis. In turn, if identifier object 128 information is available, the destination of the search can also be pre-curated. It should be understood that in the time of such crises, the networks of network 108 and system 100 as a whole can be extremely stretched, as the network 108 may be required to manage the crises and/or may be damaged, and thus the pre-curation of travel searches can improve the likelihood of users 124 making it to a safe destination away from the crisis and make efficient use of scarce network networks.

Figure 11:
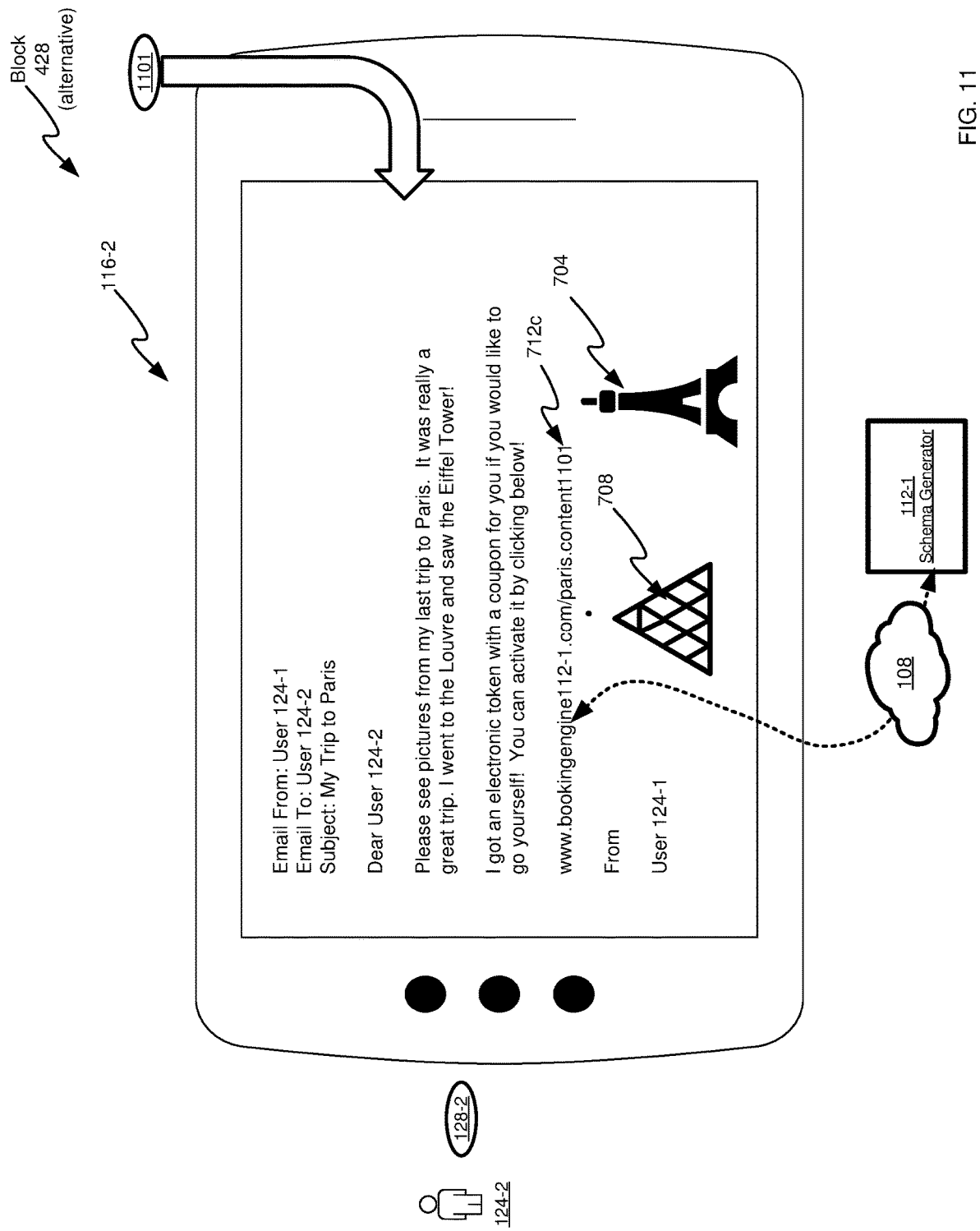
FIG. 11 shows another variant on FIG. 7.

Another illustrative variant is shown in FIG. 11, where creators 123 and platforms 104 can be omitted. Likewise content 122 is omitted and replaced with content 1101 generated and transmitted by other users 124. In FIG. 11, as an example it is assumed that user 124-1 has completed a schema, such as the schema discussed in relation to FIG. 9 based on token 712a. Upon completion of that schema, user 124-1 is issued another token 712c which user 124-1 can distribute to their network. FIG. 11 shows device 116-2 belonging to user 124-2. Device 116-2 is shown displaying electronic message content 1101 from user 124-1 to user 124-2, which includes photographs of the trip and includes token 712c in the text of the email. User 124-2 is invited to select token 712c to enjoy a pre-curated search travel experience.

(User 124-1 can be issued token 712c in other contexts as well, not just upon completion of another schema. The point is that token 712c can be delivered by sources other than content 122 or platforms 104.)

It will now be appreciated that these individual examples involving device 116-1 and device 116-2 are simplified, and that system 100 and the generation of content 122 and tokens, such as token 712 and its infinite variants, and itineraries, such as schema 504, can massively scale across literally millions of sources of content 122 and devices 116 and all types of platforms 104 and schema generators 112. It is thus contemplated that, especially at scale, a significant improvement in efficient uses of networks of network 108 and generators 112 can be achieved by reducing the amount of repeated travel searches and to initially generate relevant travel searches for users 124.

Note that one or more of the applications 224 may include machine learning and/or deep-learning based algorithms and/or neural networks, and the like, which are trained to improve the determination of itineraries and/or content at block 404 and block 408. (Hereafter machine learning applications 224). Furthermore, in these examples, the machine learning applications 224 may be operated by the engine 120 in a training mode to train the machine learning and/or deep-learning based algorithms and/or neural networks of the machine learning applications 224 in accordance with the teachings herein.

The one or more machine-learning algorithms and/or deep learning algorithms and/or neural networks of the machine learning applications 224 may include, but are not limited to: a generalized linear regression algorithm; a random forest algorithm; a support vector machine algorithm; a gradient boosting regression algorithm; a decision tree algorithm; a generalized additive model; neural network algorithms; deep learning algorithms; evolutionary programming algorithms; Bayesian inference algorithms; reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like. To be clear, any suitable machine-learning algorithm and/or deep learning algorithm and/or neural network is within the scope of present specification.

The machine learning model training can be based on data from reporting application 154 and reporting application 158, as well as identifier objects 128 (as permitted), in order to ascertain which itineraries, content and digital redirect tokens lead to improved efficiencies by reducing the number of wasted redirects and increasing the number of actual travel bookings, to thereby constantly refine the determinations made at block 404 and block 408 to further improve the use of networks of network 108 and the nodes of system 100, reducing the amount of churn and wasted searches.

In view of the above it will now be apparent that variants, combinations, and subsets of the foregoing embodiments are contemplated. For example, a token such as token 712 can be implemented also as a coupon, where the travel schema also includes a field indicating a discount or other financial incentive if the token 712 is activated. In another variant, a token such as token 712 can be embedded directly within an advertisement itself, rather than user-generated social media content, or within a television broadcast, or other type of content 122 discussed herein, in which case the advertisement is deemed a form of primary content for the purposes of this specification. Such advertisements could be banner advertisements or short movies.

It is to be recognized that features and aspects of the various examples provided above can be combined into further examples that also fall within the scope of the present disclosure. In addition, the figures are not to scale and may have size and shape exaggerated for illustrative purposes.

The invention claimed is:

1. A computing network optimization engine including a processor configured to:
   receive an electronic travel schema blueprint available from a travel schema generator, the electronic travel schema blueprint based on a set of generalized schema parameters and including only one of a destination or an origin;
   select at least one primary content for affiliation with the electronic travel schema blueprint;
   generate a digital redirect token including an identification of: i) the electronic travel schema blueprint and ii) a target platform to which a client device is redirected when the digital redirect token is activated; the digital redirect token carrying to the target platform an account identifier respective to activation of the digital redirect token; the digital redirect token for generating a tailored electronic travel schema based on the electronic travel schema blueprint and a demographic information dataset associated to the account identifier, the demographic information dataset including the other one of the destination and the origin such that the tailored electronic travel schema includes both the destination and the origin;
   determine a content propagation platform hosting the at least one primary content; and
   forward the digital redirect token to the content propagation platform for transmission with the primary content.

2. The computing network optimization engine of claim 1 wherein the processor is further configured to:
   receive an activation signal corresponding to the digital redirect token; and,
   redirect the client device to the target platform.

3. The computing network optimization engine of claim 2 wherein the target platform is the travel schema generator including a booking interface respective to the electronic travel schema blueprint.

4. The computing network optimization engine of claim 2 wherein the target platform is a server that hosts an electronic coupon respective to the electronic travel schema blueprint.

5. The computing network optimization engine of claim 1 wherein the primary content is at least one of a web page, a game, a book, news, search results, a social media post, an audio file, a video file, a movie, a television program, a news cast, a talk show, an email, a text and a direct message.

6. The computing network optimization engine of claim 1 wherein the set of generalized schema parameters includes one or more of the destination, an accommodation, and an activity.

7. The computing network optimization engine of claim 1 wherein the electronic travel schema blueprint is based on a range of different travel actor options corresponding to the set of generalized schema parameters.

8. The computing network optimization engine of claim 1 wherein the target platform is one of a plurality of target platforms selected to load-balance redirections from a plurality of different client devices accessing the same digital redirect token.

9. A method for computing network optimization comprising:
- receiving an electronic travel schema blueprint available from a travel schema generator, the electronic travel schema blueprint based on a set of generalized schema parameters and including only one of a destination or an origin;
- selecting at least one primary content for affiliation with the electronic travel schema blueprint;
- generating a digital redirect token including an identification of: i) the electronic travel schema blueprint and ii) a target platform to which a client device is redirected when the digital redirect token is activated;
- determining a content propagation platform hosting the at least one primary content;
- forwarding the digital redirect token to the content propagation platform for transmission with the primary content
- receiving an activation signal corresponding to the digital redirect token, the activation signal associated to an account identifier;
- generating a specific travel search query for a target platform; the specific travel search query based on the electronic travel schema blueprint and a demographic information dataset associated to the account identifier, the demographic information dataset including the other one of the destination and the origin such that the specific travel search query includes both the destination and the origin; and
- redirecting the client device to the target platform sending the specific travel search query to the target platform.

10. The method of claim 9 wherein the target platform is the travel schema generator including a booking interface respective to the electronic travel schema blueprint.

11. The method of claim 9 wherein the target platform is a server that hosts an electronic coupon respective to the electronic travel schema blueprint.

12. The method of claim 9 wherein the primary content is at least one of a web page, a game, a book, news, search results, a social media post, an audio file, a video file, a movie, a television program, a news cast, a talk show, an email, a text and a direct message.

13. The method of claim 9 wherein the set of generalized schema parameters includes one or more of the destination, an accommodation, and an activity.

14. The method of claim 9 wherein the electronic travel schema blueprint is based on a range of different travel actor options corresponding to the set of generalized schema parameters.

15. A computing network optimization engine including a processor configured to:
- receive an electronic travel schema blueprint available from a travel schema generator, the electronic travel schema blueprint based on a set of generalized schema parameters and including only one of a destination or an origin;
- select at least one primary content for affiliation with the electronic travel schema blueprint;
- generate a digital redirect token including an identification of: i) the electronic travel schema blueprint and ii) a target platform to which a client device is redirected when the digital redirect token is activated; the digital redirect token carrying to the target platform an account identifier respective to activation of the digital redirect token; the digital redirect token for generating a tailored electronic travel schema based on the electronic travel schema blueprint and a demographic information dataset associated to the account identifier, the demographic information dataset including the other one of the destination and the origin such that the tailored electronic travel schema includes both the destination and the origin; the target platform being one of a plurality of target platforms selected to load-balance redirections from a plurality of different client devices accessing the same digital redirect token;
- determine a content propagation platform hosting the at least one primary content; and
- forward the digital redirect token to the content propagation platform for transmission with the primary content.

* * * * *